United States Patent
Liang et al.

(10) Patent No.: US 9,933,863 B2
(45) Date of Patent: Apr. 3, 2018

(54) OPTICAL OBJECT RECOGNITION SYSTEM

(71) Applicant: PIXART IMAGING INC., Hsin-Chu County (TW)

(72) Inventors: Chia-Cheun Liang, Hsin-Chu (TW); Yi-Hsien Ko, Hsin-Chu (TW); Han-Ping Cheng, Hsin-Chu (TW)

(73) Assignee: PIXART IMAGING INC., Hsin-Chu County (TW)

( * ) Notice: Subject to any disclaimer, the term of this patent is extended or adjusted under 35 U.S.C. 154(b) by 172 days.

(21) Appl. No.: 13/905,672

(22) Filed: May 30, 2013

(65) Prior Publication Data

US 2014/0354545 A1 Dec. 4, 2014
US 2016/0239103 A9 Aug. 18, 2016

(30) Foreign Application Priority Data

May 31, 2012 (TW) ............... 101119682 A (51) Int. Cl.
*G06F 3/033* (2013.01)
*G06F 3/03* (2006.01)

(52) U.S. Cl.
CPC ............ *G06F 3/033* (2013.01); *G06F 3/0325* (2013.01)

(58) Field of Classification Search
None
See application file for complete search history.

(56) References Cited

U.S. PATENT DOCUMENTS

| | | | |
|---|---|---|---|
| 6,972,773 B2* | 12/2005 | Matsui et al. | 345/611 |
| 8,199,625 B2* | 6/2012 | Kurihara et al. | 369/59.11 |
| 8,369,368 B2* | 2/2013 | Kurihara et al. | 372/38.02 |
| 2002/0021303 A1* | 2/2002 | Matsui et al. | 345/611 |
| 2004/0056010 A1* | 3/2004 | Ho | G01B 11/272 219/121.78 |
| 2004/0085541 A1* | 5/2004 | Goernemann | G01B 9/021 356/450 |
| 2009/0289966 A1* | 11/2009 | Ikeda | G09G 3/2018 345/690 |
| 2011/0267269 A1 | 11/2011 | Tardif et al. | |
| 2012/0262365 A1* | 10/2012 | Mallinson | 345/156 |
| 2014/0015990 A1* | 1/2014 | Liang et al. | 348/211.99 |

FOREIGN PATENT DOCUMENTS

| | | | |
|---|---|---|---|
| JP | 2011070197 | * | 4/2011 |
| JP | 2011070197 A | | 4/2011 |

* cited by examiner

*Primary Examiner* — Jennifer Mehmood
*Assistant Examiner* — Parul Gupta
(74) *Attorney, Agent, or Firm* — Hauptman Ham, LLP (57) ABSTRACT

An optical object recognition system includes at least two beacons, an image sensor and a processing unit. The beacons operate in an emission pattern and the emission pattern of the beacons has a phase shift from each other. The image sensor captures image frames with a sampling period. The processing unit is configured to recognize different beacons according to the phase shift of the emission pattern in the image frames.

16 Claims, 6 Drawing Sheets

OPTICAL OBJECT RECOGNITION SYSTEM

CROSS REFERENCE TO RELATED APPLICATION

This application claims the priority benefit of Taiwan Patent Application Serial Number 101119682, filed on May 31, 2012, the full disclosure of which is incorporated herein by reference.

BACKGROUND

1. Field of the Disclosure

This disclosure generally relates to a human-machine interface device and, more particularly, to an optical object recognition system.

2. Description of the Related Art

In conventional display systems, the output parameters, including the volume, brightness and channel etc., can only be controlled unidirectionally by a remote controller but interactive functions are not included in the system. It is able to provide a control interface which has more functions by using an image sensor to capture images of light emitters and by controlling a cursor shown on a display device according to the position variation of the images of light emitters and an integrated multimedia system can be easily implemented in this way.

For example, U.S. Patent Publication No. 2006/0284841, entitled Apparatus, method, and medium for implementing pointing user interface using signals of light emitters, discloses a method of controlling a display device using a remote controller, wherein different light emitters are designed to emit light at different lighting frequencies and the remoter controller distinguishes the different light emitters by recognizing the different lighting frequencies. In other words, in the conventional art the light emitters have to be controlled to have different lighting frequencies so that the remote controller is able to distinguish the different light emitters accordingly.

Accordingly, the present disclosure further provides an optical object recognition system capable of recognizing a plurality of beacons having the same emission pattern.

SUMMARY

The present disclosure provides an optical object recognition system in which at least two beacons operate with the same emission pattern having a phase shift.

The present disclosure provides an optical object recognition system including at least two beacons, an image sensor and a processing unit. The beacons operate with a same emission pattern and the same emission pattern of different beacons has a phase shift from each other. The image sensor is configured to capture image frames with a sampling period. The processing unit is configured to recognize the different beacons according to the phase shift of the same emission pattern in the image frames.

The present disclosure further provides an optical object recognition system including a light control unit, a plurality of beacons, an image sensor and a processing unit. The light control unit is configured to generate a first activation signal. The plurality of beacons are connected in serial, and a first beacon of the plurality of beacons operates with an emission pattern and generates a second activation signal after receiving the first activation signal, and the beacons connected after the first beacon operate with the emission pattern after receiving the second activation signal, and the beacons connected after the first beacon but not the last beacon further generate the second activation signal to a next beacon thereof, wherein the emission pattern of each of the beacons delay a phase shift from that of a previous beacon thereof. The image sensor is configured to capture image frames with a sampling period. The processing unit is configured to recognize different beacons according to the phase shift of the emission pattern in the image frames.

The present disclosure further provides an optical object recognition system including a control unit, at least two beacons, an image sensor and a processing unit. The light control unit is configured to generate an activation signal. The at least two beacons operate with a same emission pattern after receiving the activation signal and the same emission pattern of different beacons has a phase shift from each other. The image sensor is configured to capture image frames with a sampling period. The processing unit is configured to recognize the different beacons according to the phase shift of the same emission pattern in the image frames.

In an aspect, the same emission pattern may be irradiating continuously for a number of times and then turning off for once at an operating frequency, wherein the phase shift may be equal to a reciprocal of the operating frequency.

In an aspect, the number of times that the beacons irradiate continuously is larger than or equal to a number of the beacons as long as the beacons irradiate simultaneously for at least one time within a predetermined time interval.

In an aspect, the phase shifts between two different pairs of the beacons may be identical or different.

In the optical object recognition system of the present disclosure, the processing unit recognizes different beacons according to an extinction sequence of the beacons after or before the beacons irradiate simultaneously. In this manner, even though all of the beacons operate with the same emission pattern, it is able to distinguish different beacons.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
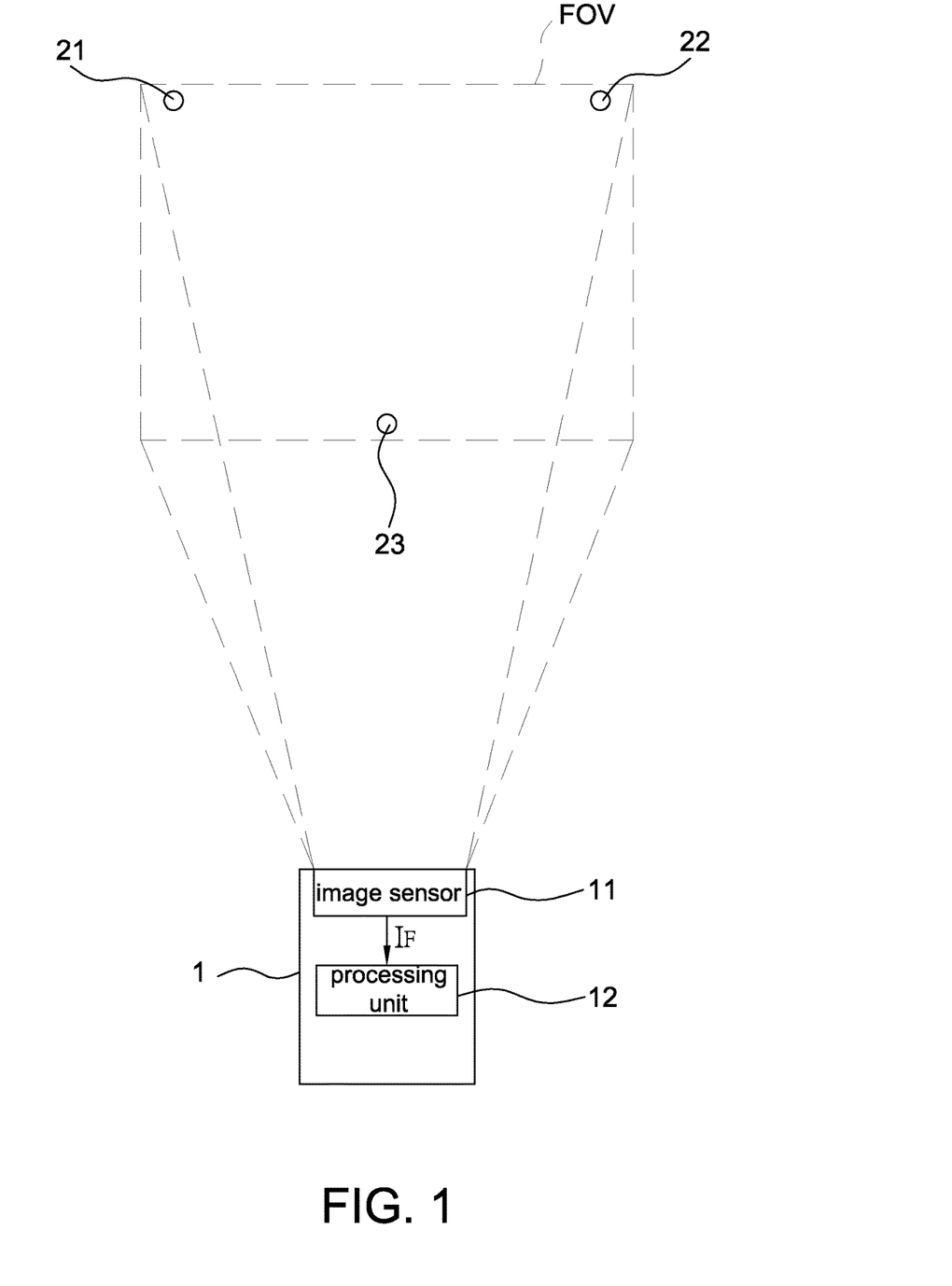
FIG. 1 shows a schematic diagram of the optical object recognition system according to an embodiment of the present disclosure.
Figure 2A:
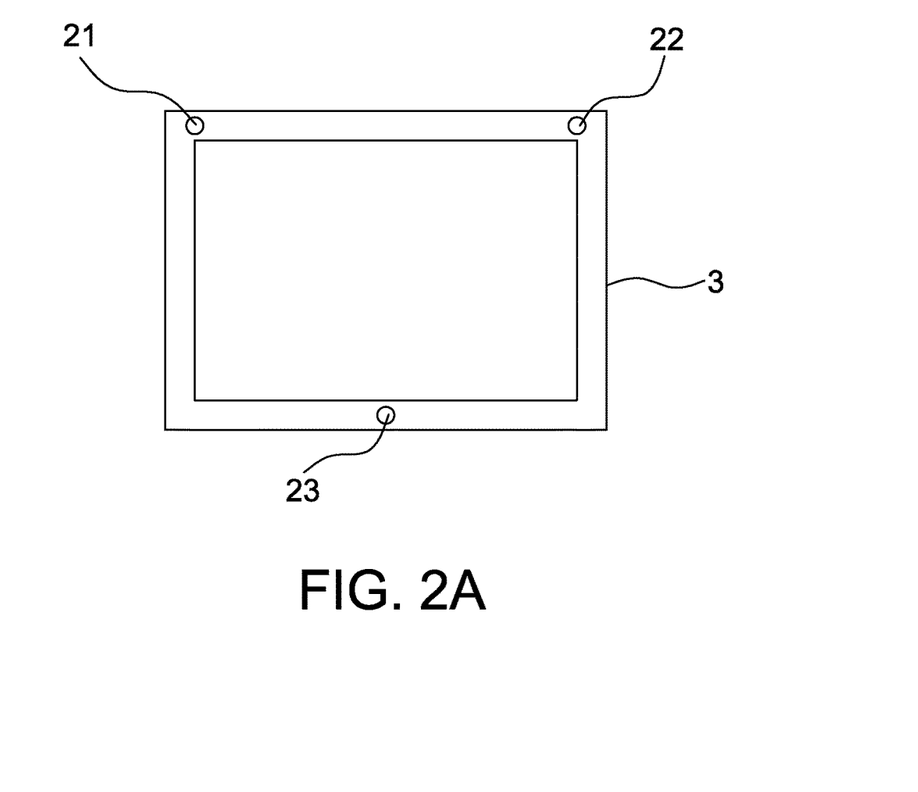
FIG. 2A shows a schematic diagram of a plurality of beacons integrated with an image display in the optical object recognition system according to the embodiment of the present disclosure.
Figure 2B:
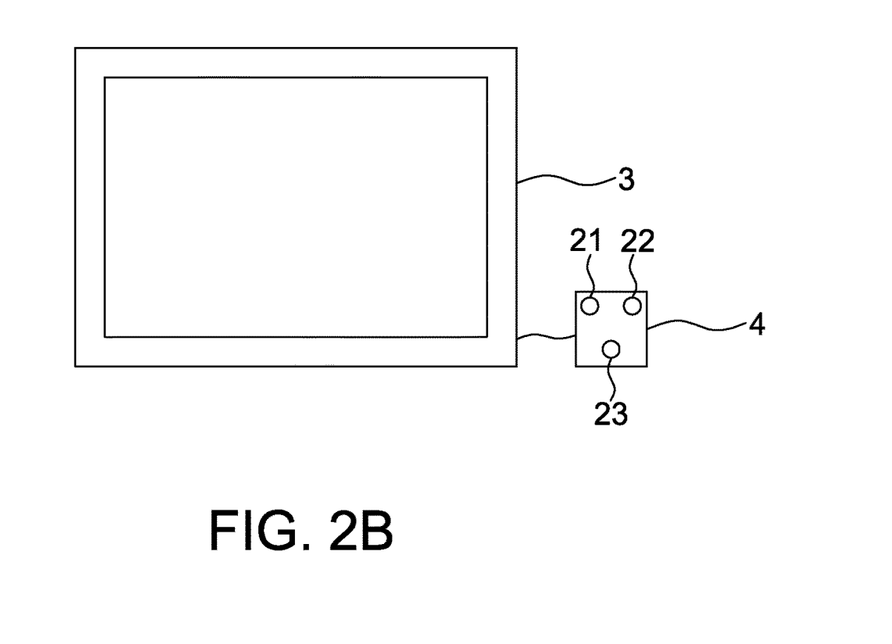
FIG. 2B shows a schematic diagram of a plurality of beacons disposed on an independent device in the optical object recognition system according to the embodiment of the present disclosure.

Referring to FIGS. 1, 2A and 2B, they show schematic diagrams of the optical object recognition system according to the embodiment of the present disclosure. The optical object recognition system includes a remote controller 1 and at least two beacons (e.g. three beacons 21-23 are shown herein). The remote controller 1 may be, for example, an optical navigation device, an optical pointing device, an optical gesture recognition device or other devices capable of controlling an image display according to image frames captured, e.g. cursor control, icon selection or screen scroll. The beacons 21-23 may be, for example, light emitting diodes or laser diodes configured to emit red light, infrared light or other invisible light and integrated with or disposed close to an image display. In other words, the beacons 21-23 may be integrated with an image display 3 (as shown in FIG. 2A) or disposed on an independent device 4 (as shown in FIG. 2B), which may be electrically or wirelessly coupled to the image display 3. It is appreciated that a number of the beacons is not limited to 3 and the optical object recognition system may include 2 to 4 beacons, but not limited to, according to the algorithm used for calculating the displacement and the coordinate.

The beacons 21-23 operate with a same emission pattern and the emission pattern of the beacons 21-23 has a phase shift from each other (described later).

The remote controller 1 includes an image sensor 11 and a processing unit 12, wherein the image sensor 11 may have a field of view (FOV). It is appreciated that a shape and a size of the FOV may be determined according to the image sensor 11 and is not limited to those shown in FIG. 1.

The image sensor 11 may be a CCD image sensor, a CMOS image sensor or other sensors capable of sensing optical energy and configured to capture image frames $I_F$ with a sampling period and the image frames $I_F$ will be sent to the processing unit 12.

The processing unit 12 may be a digital signal processor (DSP) and configured to process the image frames $I_F$ outputted by the image sensor 11 or a processing circuit embedded with the image sensor 11. For example, the processing unit 12 may recognize different beacons 21-23 according to the phase shift of the emission pattern associated with the beacons 21-23 in the image frames $I_F$. When individual beacons 21-23 are recognized, the processing unit 12 may control the image display 3 to refresh screen or execute specific applications according to the position variation (e.g. displacement or rotation) of images of the beacons 21-23 in successive image frames $I_F$.

The emission pattern of the beacons (still using three beacons for illustration purpose) 21-23 is described hereinafter. In the present disclosure, each of the beacons irradiates with a same emission pattern. In one embodiment, the emission pattern may be arranged as irradiating continuously for a number of times and then turning off once based on an operating frequency.

Referring to FIGS. 3A-3F, they show schematic diagrams of the operation of the optical object recognition system according to the embodiment of the present disclosure, wherein the symbol "o" indicates the irradiation of beacons and the symbol "x" indicates the turning off of beacons. The image sensor 11 captures image frames with a sampling period Ts, wherein a reciprocal of the sampling period Ts is the sampling frequency. For example, the image sensor 11 respectively captures an image frame at times $t_1$-$t_{15}$.

Figure 3A:
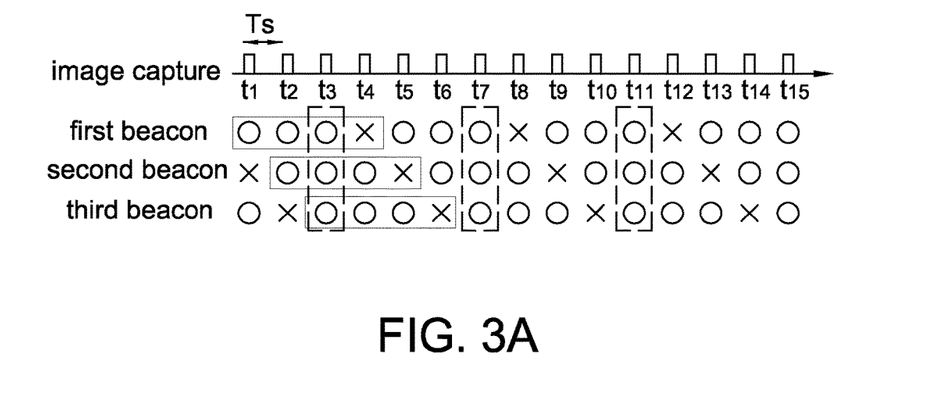
FIGS. 3A-3F show schematic diagrams of the operation of the optical object recognition system according to the embodiment of the present disclosure.

In FIG. 3A, a first beacon 21, a second beacon 22 and a third beacon 23 irradiates continuously for three times and then turns off once at an operating frequency (e.g. the operating frequency is equal to the sampling frequency of the image sensor 11 herein); i.e. the emission pattern is "oooх". In this embodiment, the emission patterns of the beacons 21-23 have a phase shift from each other, e.g. the emission pattern of the second beacon 22 delays one phase shift from that of the first beacon 21 and the emission pattern of the third beacon 23 delays one phase shift from that of the second beacon 22. The phase shift is equal to a reciprocal of the operating frequency herein, e.g. when the operating frequency of the beacons 21-23 is equal to the sampling frequency of the image sensor 11, the phase shift is equal to the sampling period Ts. The processing unit 12 recognizes different beacons according to an extinction sequence after or before the beacons 21-23 irradiate simultaneously (e.g. at times $t_3$, $t_7$ and $t_{11}$). For example, after the beacons 21-23 irradiate simultaneously, the first beacon 21 turns off at times $t_4$, $t_8$ and $t_{12}$, the second beacon 22 turns off at times $t_5$, $t_9$ and $t_{13}$, and the third beacon 23 turns off at times $t_6$, $t_{10}$ and $t_{14}$. For example, before the beacons 21-23 irradiate simultaneously, the third beacon 23 turns off at times $t_2$, $t_6$ and $t_{10}$, the second beacon 22 turns off at times $t_1$, $t_5$ and $t_9$, and the first beacon 21 turns off at times $t_4$ and $t_8$. Therefore, the processing unit 12 may distinguish different beacons according to the extinction sequence of the beacons 21-23.

Figure 3B:
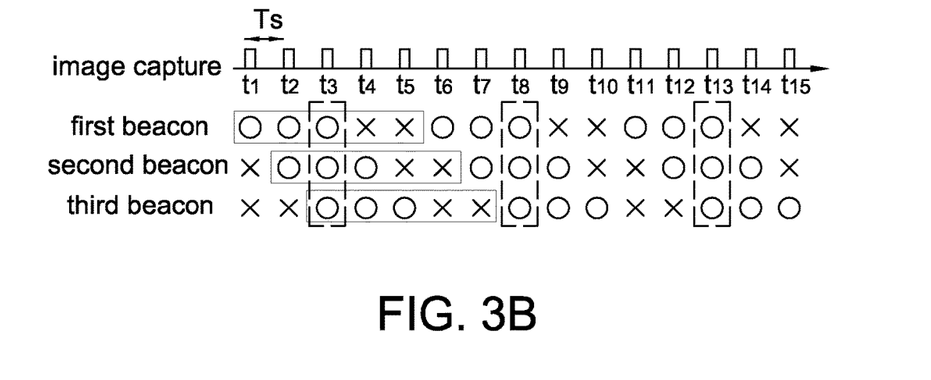

In FIG. 3B, the first beacon 21, the second beacon 22 and the third beacon 23 irradiates continuously for three times and then turns off for two times at an operating frequency; i.e. the emission pattern is "oooxx". The processing unit 12 recognizes different beacons according to an extinction sequence after or before the beacons 21-23 irradiate simultaneously (e.g. at times $t_3$, $t_8$ and $t_{13}$). For example, after the beacons 21-23 irradiate simultaneously, the first beacon 21 turns off at times $t_4$, $t_9$ and $t_{14}$; the second beacon 22 turns off at times $t_5$, $t_{10}$ and $t_{15}$; and the third beacon 23 turns off at times $t_6$ and $t_{11}$. For example, before the beacons 21-23 irradiate simultaneously, the third beacon 23 turns off at times $t_2$, $t_7$ and $t_{12}$; the second beacon 22 turns off at times $t_1$, $t_6$ and $t_{11}$; and the first beacon 21 turns off at times $t_5$ and $t_{10}$. Therefore, the processing unit 12 may distinguish different beacons according to the extinction sequence of the beacons 21-23.

Figure 3C:
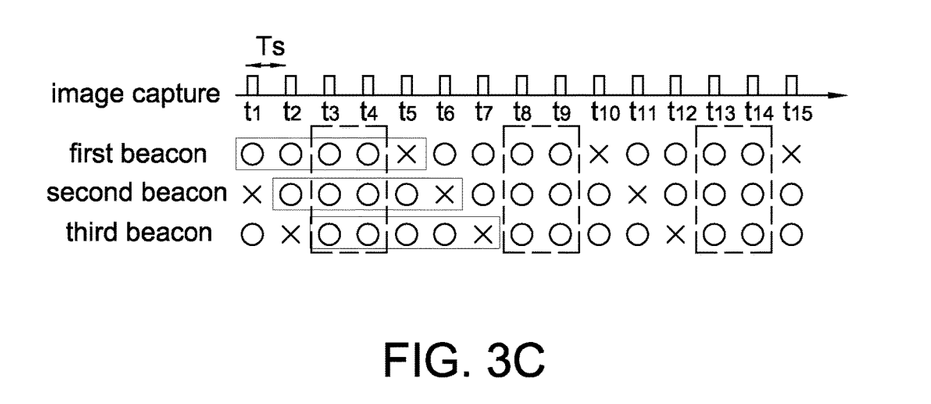

In FIG. 3C, the first beacon 21, the second beacon 22 and the third beacon 23 irradiates continuously for four times and then turns off once at an operating frequency; i.e. the emission pattern is "ooоox". The processing unit 12 recognizes different beacons according to an extinction sequence after the beacons 21-23 irradiate simultaneously (e.g. at times $t_4$, $t_9$ and $t_{14}$) or before the beacons 21-23 irradiate simultaneously (e.g. at times $t_3$, $t_8$ and $t_{13}$). For example, after the beacons 21-23 irradiate simultaneously, the first beacon 21 turns off at times $t_5$, $t_{10}$ and $t_{15}$; the second beacon 22 turns off at times $t_6$ and $t_{11}$; and the third beacon 23 turns off at times $t_7$ and $t_{12}$. For example, before the beacons 21-23 irradiate simultaneously, the third beacon 23 turns off at times $t_2$, $t_7$ and $t_{12}$; the second beacon 22 turns off at times $t_1$, $t_6$ and $t_{11}$; and the first beacon 21 turns off at times $t_5$ and $t_{10}$. Therefore, the processing unit 12 may distinguish different beacons according to the extinction sequence of the beacons 21-23.

Figure 3D:
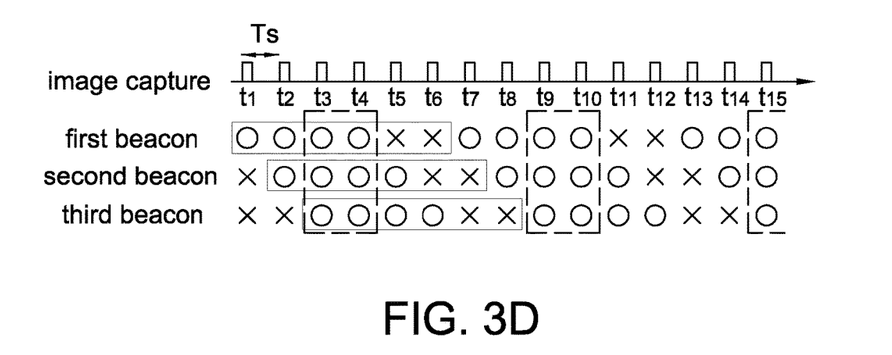

In FIG. 3D, the first beacon 21, the second beacon 22 and the third beacon 23 irradiates continuously for four times and then turns off for two times at an operating frequency; i.e. the emission pattern is "ooooxx". The processing unit 12 recognizes different beacons according to an extinction sequence after the beacons 21-23 irradiate simultaneously (e.g. at times $t_4$ and $t_{10}$) or before the beacons 21-23 irradiate simultaneously (e.g. at times $t_3$, $t_9$ and $t_{15}$). For example, after the beacons 21-23 irradiate simultaneously, the first beacon 21 turns off at times $t_5$ and $t_{11}$; the second beacon 22 turns off at times $t_6$ and $t_{12}$; and the third beacon 23 turns off at times $t_7$ and $t_{13}$. For example, before the beacons 21-23 irradiate simultaneously, the third beacon 23 turns off at times $t_2$, $t_8$ and $t_{14}$; the second beacon 22 turns off at times $t_1$, $t_7$ and $t_{13}$; and the first beacon 21 turns off at times $t_6$ and $t_{12}$. Therefore, the processing unit 12 may distinguish different beacons according to the extinction sequence of the beacons 21-23.

Figure 3E:
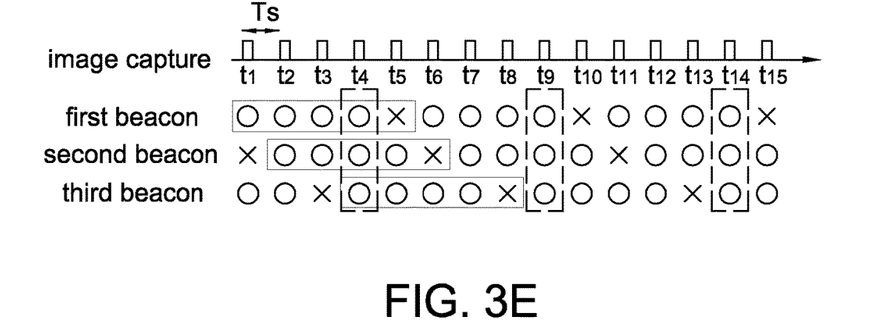

FIG. 3E is an alternative embodiment of FIG. 3C; that is, the emission pattern is also "○○○○x". In this embodiment, the first beacon 21 and the second beacon 22 operate with a first phase shift (e.g. one sampling period Ts herein) and the second beacon 22 and the third beacon 23 operate with a second phase shift (e.g. two sampling periods Ts herein), wherein the first phase shift is different from the second phase shift. The processing unit 12 may also recognize different beacons according to an extinction sequence after or before the beacons 21-23 irradiate simultaneously (e.g. at times $t_4$, $t_9$ and $t_{14}$). In this embodiment, after the processing unit 12 recognizes that the beacons 21-23 irradiate simultaneously for the first time (e.g. at times $t_4$, $t_9$ and $t_{14}$), the second time that the beacons 21-23 irradiate simultaneously (e.g. at times $t_7$ and $t_{12}$) may be ignored if all the beacons 21-23 have not been recognized, wherein the term "ignored" herein means that the second time that the beacons 21-23 irradiate simultaneously is not served as a start point of the beacon recognition. Of course, the present disclosure may be arranged as when different pairs of the beacons have different phase shifts, the condition that all beacons irradiate simultaneously does not occur within a time interval that all beacons is turning off sequentially, i.e. conditions at times $t_7$ and $t_{12}$ do not occur. For example, when a number of times that the beacons irradiate continuously at the operating frequency is larger than a number of the beacons, conditions at times $t_7$ and $t_{12}$ can be prevented by increasing the number of times that the beacons turn off continuously as shown in FIG. 3F.

Figure 3F:
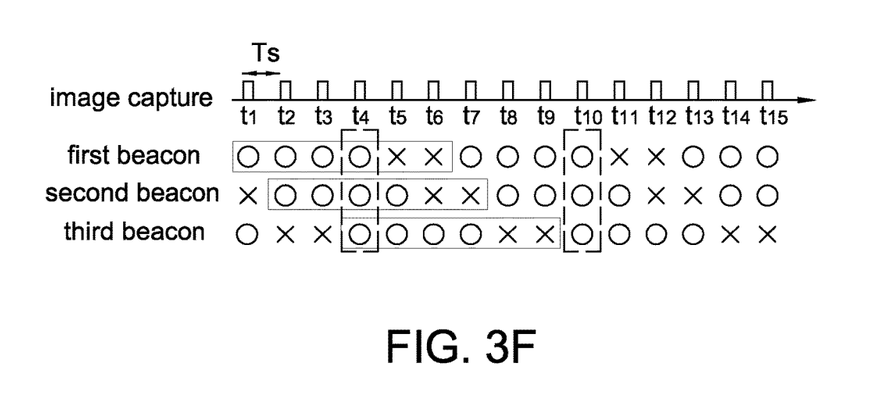

FIG. 3F is an alternative embodiment of FIG. 3D; that is, the emission pattern is also "○○○○xx". In this embodiment, the first beacon 21 and the second beacon 22 operate with a first phase shift (e.g. one sampling period Ts herein) and the second beacon 22 and the third beacon 23 operate with a second phase shift (e.g. two sampling periods Ts herein), wherein the first phase shift is different from the second phase shift. The processing unit 12 may also distinguish different beacons according to an extinction sequence after or before the beacons 21-23 irradiate simultaneously (e.g. at times $t_4$ and $t_{10}$).

It should be mentioned that the number of times that the beacons irradiate continuously and the number of times that the beacons turn off continuously are not limited to those shown in FIGS. 3A-3F as long as the number of times that the beacons irradiate continuously is larger than or equal to a number of the beacons. In other words, when the number of times that the beacons irradiate continuously is larger than or equal to the number of the beacons, the beacons may irradiate simultaneously for at least once within a predetermined time interval. In addition, phase shifts between different pairs of the beacons may be different according to different applications as long as the corresponding recognition mechanism is previously set in the processing unit 12.

In addition, the emission pattern is not limited to those shown in FIGS. 3A-3F as long as the beacons can irradiate simultaneously for at least once within a predetermined time interval since the processing unit 12 has to recognize different beacons according to an extinction sequence of the beacons after or before the beacons irradiate simultaneously. Therefore, the processing unit 12 may recognize different beacons according to the phase shift of the emission pattern in a predetermined number of image frames $I_F$ containing at least one beacon image, and said predetermined number of image frames $I_F$ may be at least an operating time between two non-successive simultaneous irradiations of the beacons added by 1; for example, the predetermined number is 3+1 in FIG. 3A, 4+1 in FIG. 3B, 3+1 in FIG. 3C, 4+1 in FIG. 3D, and 5+1 in FIG. 3F. The predetermined number may be determined according to the emission pattern actually used. For example in FIG. 3E, as it includes the simultaneous irradiation that will be ignored, the predetermined number may be defined as at least an operating time between two simultaneous irradiations of the beacons, which are not immediately adjacent to each other and are not ignored, added by 1. It should be mentioned that the operating time herein may not be identical to the sampling time of the image sensor 11 as the sampling frequency of the image sensor 11 may be larger than or equal to the operating frequency of the beacons. When the sampling frequency of the image sensor 11 is larger than (e.g. a multiple time) the operating frequency, the beacon image may regularly appear in the image frames but may not appear in each image frame.

Figure 4:
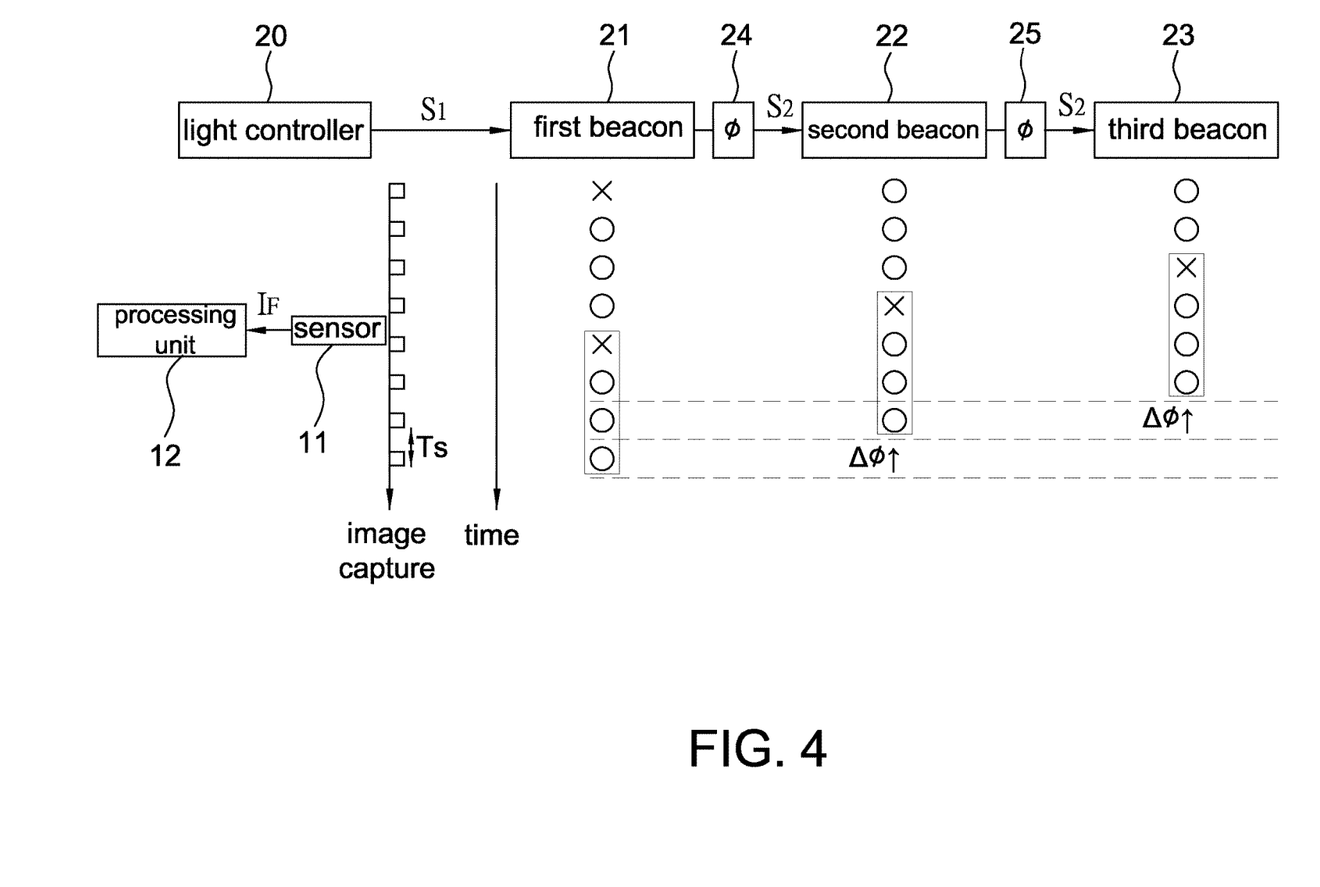
FIG. 4 shows another schematic diagram of the operation of the optical object recognition system according to the embodiment of the present disclosure.
Figure 5:
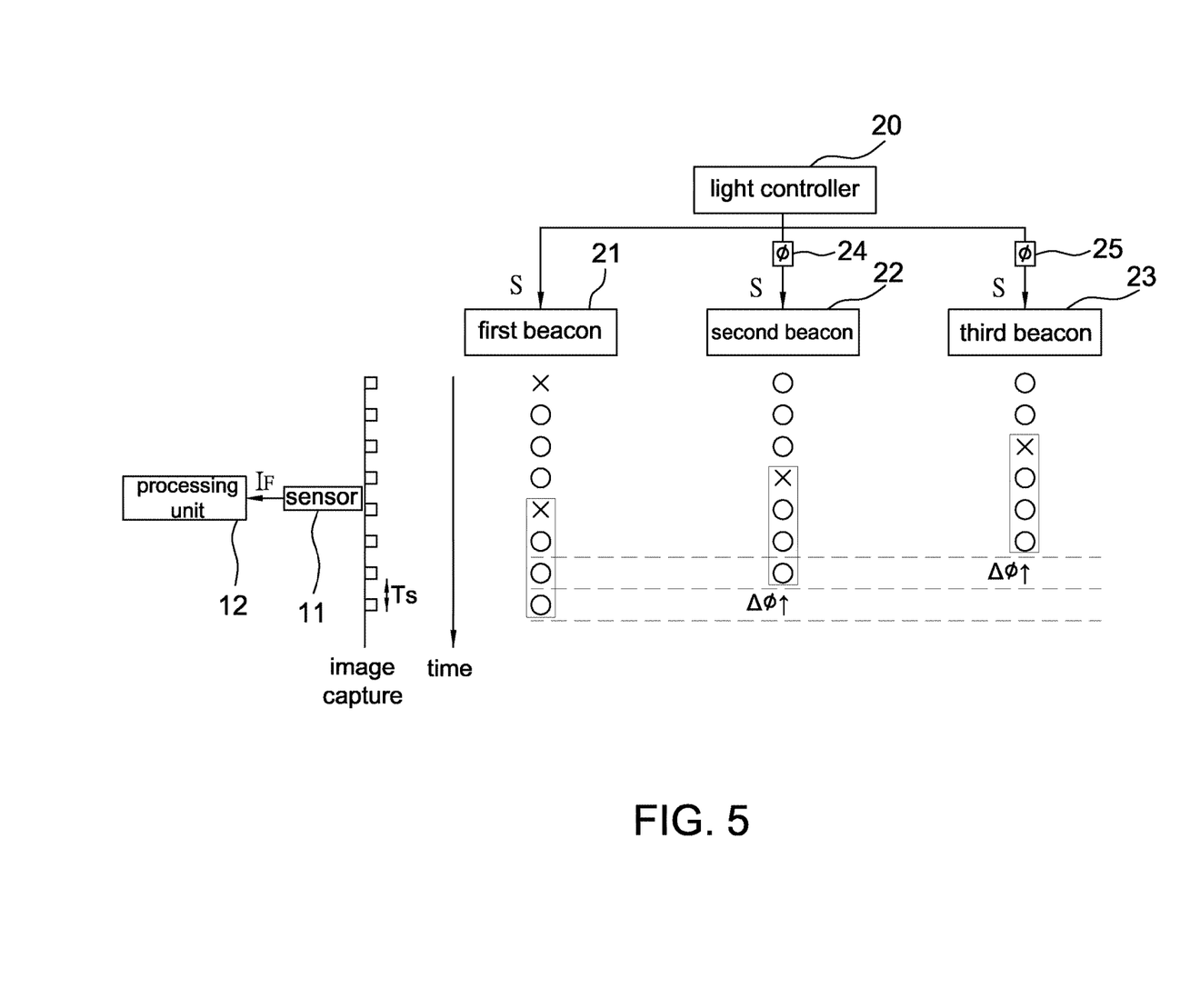
FIG. 5 shows another schematic diagram of the operation of the optical object recognition system according to the embodiment of the present disclosure.

Referring to FIGS. 4 and 5, they respectively show another schematic diagram of the operation of the optical object recognition system according to the embodiment of the present disclosure, wherein the beacons 21-23 start to operate in the same emission pattern after receiving an activation signal.

In FIG. 4, the optical object recognition system of the present disclosure includes a light control unit 20 configured to control the first beacon 21, the second beacon 22 and the third beacon 23, wherein the beacons 21-23 are serially connected. For example, the light control unit 20 sends a first activation signal $S_1$ for activating the first one of the beacons 21-23, i.e. the beacon 21 herein.

After the first beacon 21 receives the first activation signal $S_1$, the first beacon 21 operates with an emission pattern (e.g. irradiating continuously for 3 times and then turning off once at an operating frequency, i.e. "○○○x") and generates a second activation signal $S_2$. The beacons connected after the first beacon 21 (e.g. the second beacon 22 and the third beacon 23 herein) receive the second activation signal $S_2$ and then operate with the same emission pattern. The beacons connected after the first beacon 21 but not the last beacon (e.g. the second beacon 22 herein) further sends the second activation signal $S_2$ to a next beacon thereof (e.g. the third beacon 23 herein), wherein the emission pattern of each beacon delays a phase shaft from that of a previous beacon thereof. For example, the emission pattern of the second beacon 22 delays one phase shift $\Delta\Phi$ from that of the first beacon 21, and the emission pattern of the third beacon 23 delays one phase shift $\Delta\Phi$ from that of the second beacon 22, wherein the phase shift $\Delta\Phi$ is equal to a reciprocal of the operating frequency herein.

In one embodiment, the optical object recognition system of the present disclosure may further include a first delay unit 24 and a second delay unit 25 so that the time that the second beacon 22 receives the second activation signal $S_2$ may be later than the time that the first beacon 21 receives the first activation signal $S_1$ by one phase shift $\Delta\Phi$ and the time that the third beacon 23 receives the second activation signal $S_2$ may be later than the time that the second beacon 22 receives the second activation signal $S_2$ by one phase shift $\Delta\Phi$. In addition, the first delay unit 24 may be included in the second beacon 22 such that the second beacon 22 may operate with the emission pattern later than the first beacon 21 by a phase shift ΔΦ after receiving the second activation signal $S_2$, and the second delay unit 25 may be included in the third beacon 23 such that the third beacon 23 may operate with the emission pattern later than the second beacon 22 by a phase shift ΔΦ after receiving the second activation signal $S_2$. In addition, the first delay unit 24 may be included in the first beacon 21 so that the second activation signal $S_2$ may be outputted with a phase delay ΔΦ; and the second delay unit 25 may be included in the second beacon 22 so that the second activation signal $S_2$ may be outputted with a phase delay ΔΦ. In other embodiments, the first delay unit 24 and the second delay unit 24 may delay different phase shifts.

The image sensor 11 capture image frames $I_F$ with a sampling period Ts and the processing unit 12 recognizes different beacons according to the phase shift of the emission pattern in the image frames $I_F$. As mentioned above, if the operating frequency of the beacons 21-23 is equal to the sampling frequency of the image sensor 11, a reciprocal of the operating frequency is equal to the sampling period Ts. As the operating frequency is not necessary to be equal to the sampling frequency of the image sensor 11, the reciprocal of the operating frequency is not always equal to the sampling period Ts.

In FIG. 5, the optical object recognition system of the present disclosure includes a light control unit 20 configured to control the first beacon 21, the second beacon 22 and the third beacon 23, wherein the beacons 21-23 are connected in parallel. For example, the light control unit 20 sends an activation signal S for activating the beacons 21-23.

The beacons 21-23 operate with the same emission pattern (e.g. irradiating continuously for 3 times and then turning off once at an operating frequency, i.e. "◦◦◦x") after receiving the activation signal S, and the emission pattern of the beacons 21-23 has a phase shift from each other. For example, the emission pattern of the second beacon 22 delays one phase shift ΔΦ from that of the first beacon 21, and the emission pattern of the third beacon 23 delays one phase shift ΔΦ from that of the second beacon 22, wherein the phase shift ΔΦ may be equal to a reciprocal of the operating frequency.

In one embodiment, the optical object recognition system of the present disclosure may further includes a first delay unit 24 and a second delay unit 25 so that the time that the second beacon 22 receives the activation signal S may be later than the time that the first beacon 21 receives the activation signal S by one phase shift ΔΦ and the time that the third beacon 23 receives the activation signal S may be later than the time that the second beacon 22 receives the activation signal S by one phase shift ΔΦ. In addition, the first delay unit 24 may be included in the second beacon 22 such that the second beacon 22 may operate with the emission pattern later than the first beacon 21 by a phase shift ΔΦ after receiving the activation signal S, and the second delay unit 25 may be included in the third beacon 23 such that the third beacon 23 may operate with the emission pattern later than the second beacon 22 by a phase shift ΔΦ after receiving the activation signal S. In addition, the first delay unit 24 and the second delay unit 25 may be included in the light control unit 20 so that the light control unit 20 may send the activation signal S to the second beacon 22 later than to the first beacon by one phase shift ΔΦ; and the light control unit 20 may send the activation signal S to the third beacon 23 later than to the second beacon 22 by one phase shift ΔΦ. In other embodiments, the first delay unit 24 and the second delay unit 24 may delay different phase shifts.

The image sensor 11 capture image frames $I_F$ with a sampling period Ts and the processing unit 12 recognizes different beacons according to the phase shift of the emission pattern in the image frames $I_F$. As mentioned above, if the operating frequency of the beacons 21-23 is equal to the sampling frequency of the image sensor 11, a reciprocal of the operating frequency is equal to the sampling period Ts. But the operating frequency may not be equal to the sampling frequency of the image sensor 11.

It is appreciated that although different beacons may be recognized by using the recognition method of the present disclosure, the appearance of the beacons is not limited to be identical.

As mentioned above, in the conventional recognition method for recognizing light emitters, different light emitters are controlled to operate at different lighting frequencies so that the remote controller is able to distinguish the different light emitters. Therefore, the present disclosure further provides an optical object recognition system (FIG. 1) that may recognize at least two beacons irradiating with a same emission pattern and operating simultaneously so as to simplify the control mechanism of the beacons.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical object recognition system, comprising:
    at least two beacons each configured to operate with a same emission pattern including multiple irradiating states and at least one turning-off state, and the same emission patterns of different beacons having a phase shift from each other,
    wherein the multiple irradiating states of one same emission pattern occur continuously every reciprocal of an operating frequency, and the multiple irradiating states of the same emission patterns of all beacons have one irradiating state occurred simultaneously, and
    wherein the at least one turning-off state is after the continuous multiple irradiating states by the reciprocal of the operating frequency within the one same emission pattern;
    an image sensor configured to receive light emitted by the at least two beacons to capture image frames containing images of the at least two beacons with a sampling period, wherein the multiple irradiating states and at least one turning-off state are synchronized with the sampling period; and
    a processing unit configured to
        recognize the same emission pattern corresponding to individual beacons according to the multiple irradiating states and at least one turning-off state of the individual beacons in successive image frames captured by the image sensor,
        recognize the simultaneously occurred one irradiating state among the multiple irradiating states of different same emission patterns from the captured successive image frames, and
        distinguish the different beacons from each other according to a sequence of the at least one turning-off state appearing after the simultaneously occurred one irradiating state among the multiple irradiating states of the different same emission patterns recognized in the captured successive image frames.

2. The optical object recognition system as claimed in claim 1, wherein the phase shift is equal to the reciprocal of the operating frequency.

3. The optical object recognition system as claimed in claim 1, wherein a number of the continuous multiple irradiating states is larger than or equal to a number of the beacons.

4. The optical object recognition system as claimed in claim 1, wherein the at least two beacons comprises first and second beacons, and at least one irradiating state among the multiple irradiating states of the first emission pattern occurs simultaneously with at least one irradiating state among the multiple irradiating states of the second emission pattern which is the same as the first emission pattern except for the phase shift.

5. The optical object recognition system as claimed in claim 1, wherein the processing unit is further configured to distinguish the different beacons according to a difference of a number of image frames in a predetermined number of the image frames containing at least one of beacon image, and the predetermined number is at least an operating time of the beacons between two non-adjacent simultaneous irradiating states of the beacons added by 1.

6. The optical object recognition system as claimed in claim 1, wherein the beacons are configured to respectively operate with the same emission pattern after receiving an activation signal.

7. The optical object recognition system as claimed in claim 1, wherein
the at least two beacons comprise a first beacon, a second beacon and a third beacon,
the emission pattern of the first beacon and the emission pattern of the second beacon have a first phase shift from each other,
the emission pattern of the second beacon and the emission pattern of the third beacon have a second phase shift from each other, and
the first phase shift is different from the second phase shift.

8. An optical object recognition system, comprising:
a light control unit configured to generate a first activation signal;
a plurality of beacons, connected in series, wherein
a first beacon of the plurality of beacons is configured to operate with an emission pattern including multiple irradiating states and at least one turning-off state, and generate a second activation signal after receiving the first activation signal,
the beacons connected after the first beacon are configured to operate with the emission pattern after receiving the second activation signal,
the beacons connected after the first beacon but not the last beacon are further configured to generate the second activation signal to a next beacon thereof, and
the emission pattern of each of the beacons other than the first beacon is delayed by a phase shift from that of a previous beacon thereof,
wherein the multiple irradiating states of one emission pattern occur continuously every reciprocal of an operating frequency, and the multiple irradiating states of the emission patterns of all beacons have one irradiating state occurred simultaneously, and
wherein the at least one turning-off state is after the continuous multiple irradiating states by the reciprocal of the operating frequency within the one emission pattern;
an image sensor configured to receive light emitted by the plurality of beacons to capture image frames containing images of the plurality of beacons with a sampling period, wherein the multiple irradiating states and at least one turning-off state are synchronized with the sampling period; and
a processing unit configured to
recognize the emission pattern corresponding to individual beacons according to the multiple irradiating states and at least one turning-off state of the individual beacons in successive image frames captured by the image sensor,
recognize the simultaneously occurred one irradiating state among the multiple irradiating states of different emission patterns from the captured successive image frames, and
distinguish different beacons from each other according to a sequence of the at least one turning-off state appearing after the simultaneously occurred one irradiating state among the multiple irradiating states of the different emission patterns recognized in the captured successive image frames.

9. The optical object recognition system as claimed in claim 8, wherein the phase shift is equal to the reciprocal of the operating frequency.

10. The optical object recognition system as claimed in claim 8, wherein a number of the continuous multiple irradiating states is larger than or equal to a number of the beacons.

11. The optical object recognition system as claimed in claim 8, wherein the processing unit is further configured to distinguish the different beacons according to a difference of a number of image frames in a predetermined number of the image frames containing at least one of beacon image, and the predetermined number is at least an operating time of the beacons between two non-adjacent simultaneous irradiating states of the beacons added by 1.

12. An optical object recognition system, comprising:
a light control unit configured to generate an activation signal;
at least two beacons each configured to operate with a same emission pattern including multiple irradiating states and at least one turning-off state after receiving the activation signal, and the same emission patterns of different beacons having a phase shift from each other,
wherein the multiple irradiating states of one same emission pattern occur continuously every reciprocal of an operating frequency, and the multiple irradiating states of the same emission patterns of all beacons have one irradiating state occurred simultaneously, and
wherein the at least one turning-off state is after the continuous multiple irradiating states by the reciprocal of the operating frequency within the one same emission pattern;
an image sensor configured to receive light emitted by the at least two beacons to capture image frames containing images of the at least two beacons with a sampling period, wherein the multiple irradiating states and at least one turning-off state are synchronized with the sampling period; and
a processing unit configured to
recognize the same emission pattern corresponding to individual beacons according to the multiple irradiating states and at least one turning-off state of the individual beacons in successive image frames captured by the image sensor, recognize the simultaneously occurred one irradiating state among the multiple irradiating states of different same emission patterns from the captured successive image frames, and distinguish the different beacons from each other according to sequence of the at least one turning-off state appearing after the simultaneously occurred one irradiating state among the multiple irradiating states of the different same emission patterns recognized in the captured successive image frames.

13. The optical object recognition system as claimed in claim 12, wherein the phase shift is equal to the reciprocal of the operating frequency.

14. The optical object recognition system as claimed in claim 12, wherein a number of the continuous multiple irradiating states is larger than or equal to a number of the beacons.

15. The optical object recognition system as claimed in claim 12, wherein the processing unit is further configured to distinguish the different beacons according to a difference of a number of image frames in a predetermined number of the image frames containing at least one of beacon image, and the predetermined number is at least an operating time of the beacons between two non-adjacent simultaneous irradiating states of the beacons added by 1.

16. The optical object recognition system as claimed in claim 12, wherein the at least two beacons comprise a first beacon, a second beacon and a third beacon, the emission pattern of the first beacon and the emission pattern of the second beacon have a first phase shift from each other, the emission pattern of the second beacon and the emission pattern of the third beacon have a second phase shift from each other, and the first phase shift is different from the second phase shift.

* * * * *